United States Patent
Haupt et al.

(10) Patent No.: US 11,230,075 B2
(45) Date of Patent: Jan. 25, 2022

(54) METHOD AND PLANT FOR BUILDING TYRES

(71) Applicant: PIRELLI TYRE S.P.A., Milan (IT)

(72) Inventors: Oliver Haupt, Breuberg (DE); Maurizio Marchini, Milan (IT); Silvio Montanari, Milan (IT); Mario Mariani, Milan (IT); Davide Lupo Conti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 88 days.

(21) Appl. No.: 16/836,545

(22) Filed: Mar. 31, 2020

(65) Prior Publication Data

US 2020/0247075 A1 Aug. 6, 2020

Related U.S. Application Data

(63) Continuation of application No. 15/037,209, filed as application No. PCT/IB2014/065582 on Oct. 24, 2014, now Pat. No. 10,639,860.

(30) Foreign Application Priority Data

Nov. 26, 2013 (IT) .......................... MI2013A001970

(51) Int. Cl.
*B29D 30/36* (2006.01)
*B29D 30/16* (2006.01)
(Continued)

(52) U.S. Cl.
CPC ......... *B29D 30/36* (2013.01); *B29D 30/1621* (2013.01); *B29D 30/1628* (2013.01);
(Continued)

(58) Field of Classification Search
CPC ................ B29D 30/08; B29D 30/1621; B29D 30/1628; B29D 30/24; B29D 30/244;
(Continued)

(56) References Cited

U.S. PATENT DOCUMENTS 3,822,165 A 7/1974 Herbert
4,769,104 A 9/1988 Okuyama et al.
(Continued)

FOREIGN PATENT DOCUMENTS

CN 105451978 A 3/2016
EP 1827808 B1 1/2009
(Continued)

OTHER PUBLICATIONS

Final Office Action for U.S. Appl. No. 16/063,939, filed Jun. 19, 2018 on behalf of Pirelli Tyre S.P.A. dated Jun. 14, 2021 17 pages.
(Continued)

*Primary Examiner* — Robert C Dye
*Assistant Examiner* — Sedef E Paquette
(74) *Attorney, Agent, or Firm* — Steinfl + Bruno LLP

(57) ABSTRACT

A carcass sleeve is situated in a radially external position with respect to a toroidal forming drum, arranged in a first radially contracted operative condition. The carcass sleeve is shaped according to a toroidal configuration while the forming drum is positioned inside the carcass sleeve. During shaping of the carcass sleeve, the forming drum is radially expanded up to a second radially expanded operative condition. Upon completed shaping, the carcass sleeve is coupled to the forming drum in the second operative condition. The forming drum, coupled to the shaped carcass sleeve, is arranged in proximity to at least one device for building at least one belt layer at a radially external position relative to the shaped carcass sleeve.

21 Claims, 6 Drawing Sheets

Figure 1:
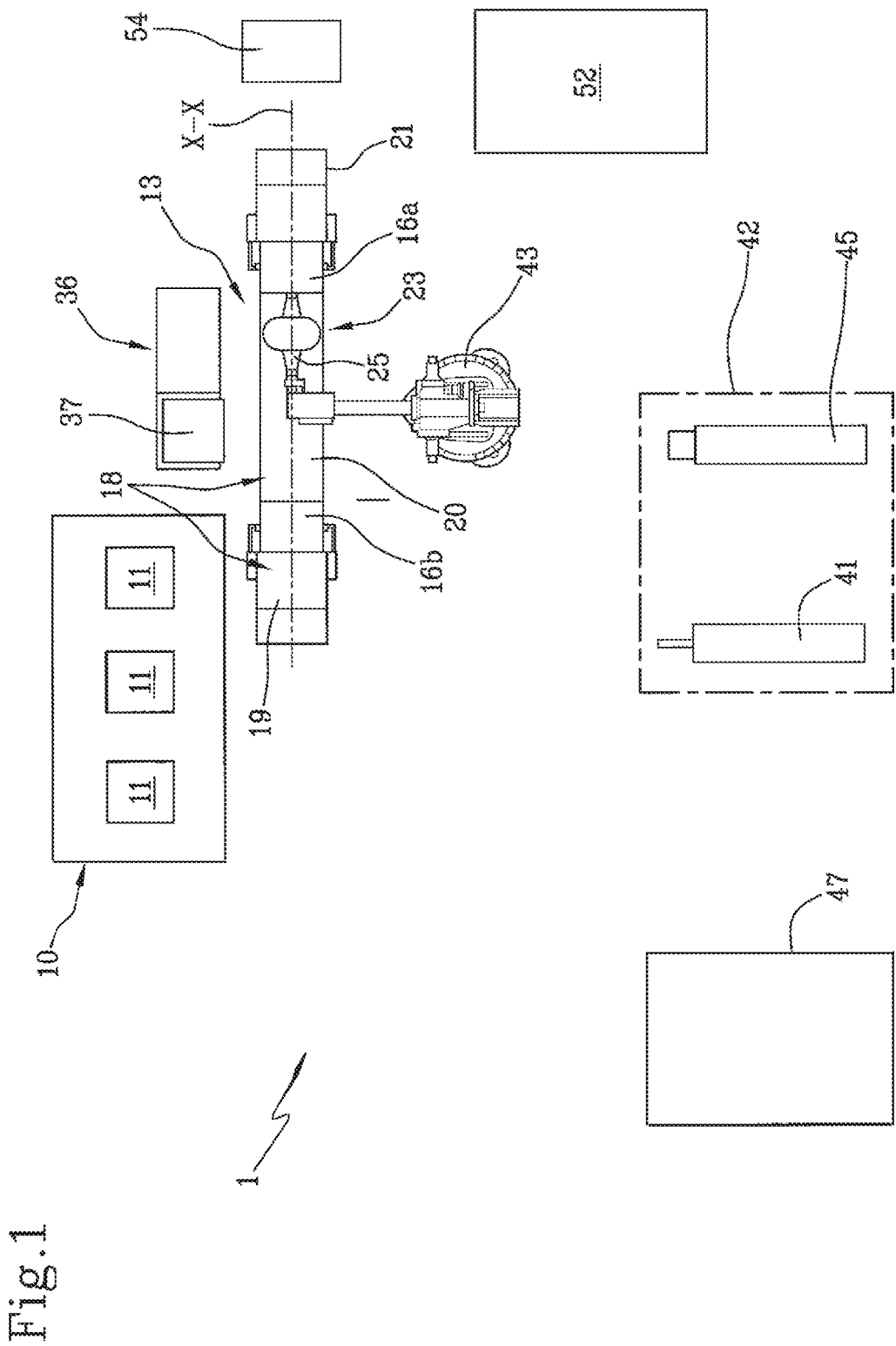

(51) Int. Cl.
*B29D 30/24* (2006.01)
*B29D 30/26* (2006.01)
*B29D 30/08* (2006.01)

(52) U.S. Cl.
CPC ............ *B29D 30/247* (2013.01); *B29D 30/08* (2013.01); *B29D 30/24* (2013.01); *B29D 30/244* (2013.01); *B29D 30/245* (2013.01); *B29D 2030/265* (2013.01); *B29D 2030/2642* (2013.01); *B29D 2030/2657* (2013.01)

(58) Field of Classification Search
CPC .... B29D 30/245; B29D 30/247; B29D 30/36; B29D 2030/2642; B29D 2030/265; B29D 2030/2657
USPC ...................................................... 156/110.1
See application file for complete search history.

(56) References Cited

U.S. PATENT DOCUMENTS

| | | | |
|---|---|---|---|
| 5,380,384 | A | 1/1995 | Tokunaga et al. |
| 5,540,803 | A | 7/1996 | Miyamoto et al. |
| 5,635,016 | A | 6/1997 | Byerley |
| 7,931,768 | B2 | 4/2011 | Seevers et al. |
| 10,639,860 | B2 | 5/2020 | Haupt et al. |
| 2002/0062908 | A1 | 5/2002 | Mancini et al. |
| 2006/0102272 | A1* | 5/2006 | Iyanagi ................. B29D 30/32 156/132 |
| 2007/0295442 | A1* | 12/2007 | Minakawa ............... B23Q 7/03 156/111 |
| 2009/0272484 | A1 | 11/2009 | Seevers et al. |
| 2014/0034221 | A1 | 2/2014 | Bignogno et al. |
| 2014/0338818 | A1* | 11/2014 | Otani ..................... B29D 30/70 156/117 |
| 2014/0345785 | A1 | 11/2014 | Wang et al. |
| 2015/0239190 | A1 | 8/2015 | Currie et al. |
| 2015/0273777 | A1 | 10/2015 | Isaka et al. |
| 2016/0144583 | A1 | 5/2016 | Mancini et al. |
| 2016/0297158 | A1 | 10/2016 | Haupt et al. |

FOREIGN PATENT DOCUMENTS

| | | |
|---|---|---|
| EP | 2746037 A1 | 6/2014 |
| JP | 2008521651 A | 6/2008 |
| JP | 2016537224 A | 12/2016 |
| SU | 579880 A3 | 11/1977 |
| WO | 2013/091530 A1 | 6/2013 |
| WO | 2015/015336 A1 | 2/2015 |

OTHER PUBLICATIONS

Non-Final Office Action for U.S. Appl. No. 16/063,939, filed Jun. 19, 2019 on behalf of Pirelli Tyre S.P.A. dated Oct. 26, 2020 29 pages.

First Office Action for Chinese Application No. 201680080094 filed on Nov. 30, 2016 on behalf of Pirelli Tyre S.P.A dated Dec. 3, 2019 11 pages (English + Original).

Japanese Notice of Reason for Rejection for Japanese Application No. 2018532299 filed on behalf of Pirelli Tire S.P.A. dated Jul. 31, 2020 18 pages (English + Original).

Restriction Requirement for U.S. Appl. No. 16/063,939, filed Jun. 19, 2018 on behalf of Pirelli Tyre S.P.A. dated Jun. 11, 2020. 9 pages.

Russian Official Decision of Grant for Russian Application No. RU2018126741 filed on Nov. 30, 2016 on behalf of Pirelli Tyre S.P.A. dated Jun. 19, 2020 25 pages (English + Original).

Screen Captures from YouTube video clip entitled "How Its Made Car Tires", uploaded on Mar. 9, 2015 by user "How It's Made". Retrieved from Internet https://www.youtube.com/watch?v=1o9mVZxoayA> . (Year: 2015).

Second Chinese Office Action for Chinese Application No. 201680080094.5 filed on behalf of Pirelli Tyre S.P.A. dated Jul. 24, 2020 6 pages (English + Original).

Russian Office Action for RU Application No. RU2018126741 filed on Nov. 30, 2016 on behalf of Pirelli Tyre S.P.A. dated Mar. 13, 2020 13 pages (English + Original).

\* cited by examiner

METHOD AND PLANT FOR BUILDING TYRES

CROSS REFERENCE TO RELATED APPLICATIONS

The present application is a continuation application of U.S. application Ser. No. 15/037,209 filed on May 17, 2016 which is the U.S. national stage of International Application PCT/IB2014/065582, filed internationally on Oct. 24, 2014 which, in turn, claims priority to Italian Patent Application No. MI2013A001970, filed on Nov. 26, 2013. The contents of each of which are incorporated by reference herein.

The present invention relates to a method, a process and a plant for building tyres.

More particularly, the invention is directed to the method, process and equipment used for building the green tyre, to be subsequently subjected to a vulcanisation cycle for the obtainment of the final product.

A tyre for vehicle wheels generally comprises a carcass structure comprising at least one carcass ply having respectively opposite end flaps engaged with respective anchoring annular structures, integrated in the zones normally identified with the name "beads", having an internal diameter substantially corresponding to a so-called "fitting diameter" of the tyre on a respective mounting rim.

The carcass structure is associated with a belt structure which can comprise one or more belt layers, situated in radial superimposition with respect to each other and with respect to the carcass ply, having textile or metallic reinforcement cords with crossed orientation and/or substantially parallel to the circumferential extension direction of the tyre (at 0 degrees). At a radially external position relative to the belt structure, a tread band is applied, it too made of elastomeric material like other semifinished products constituting the tyre.

On the lateral surfaces of the carcass structure, each extended from one of the lateral edges of the tread band up to the respective anchoring annular structure to the beads, respective sidewalk made of elastomeric material are also applied in axially external position. In the tyres of "tubeless" type, an air impermeable cover layer, normally termed "liner", covers the internal surfaces of the tyre.

After the building of the green tyre actuated by assembly of respective components, a moulding and vulcanisation treatment is generally executed aimed to determine the structural stabilisation of the tyre through cross-linking of the elastomeric compositions as well as imparting on the same, if required, a desired tread pattern and possible distinctive graphic marks at the sidewalls of the tyre.

The carcass structure and the belt structure are generally made separately from each other in respective work stations, in order to be mutually assembled at a later time.

More particularly, the obtainment of the carcass structure first provides that the carcass ply or plies are applied on a building drum, to form a substantially cylindrical so-called "carcass sleeve". The anchoring annular structures to the beads are fit or formed on the opposite end flaps of the carcass ply or plies, which are subsequently turned up around the annular structures themselves in a manner so as to enclose them in a kind of noose.

On a second drum or auxiliary drum, a so-called "crown structure" is obtained in the form of an external sleeve comprising one or more belt layers applied in mutual radial superimposition, and possibly the tread band applied at a radially external position relative to the belt layer(s). The crown structure is then drawn from the auxiliary drum in order to be coupled to the carcass sleeve. The crown structure is for such purpose arranged coaxially around the carcass sleeve, after which the carcass ply or plies are shaped according to a toroidal configuration by means of mutual axial approaching of the beads and simultaneous introduction of pressurised fluid inside the carcass sleeve, in a manner so as to cause a radial dilatation of the carcass plies until they are made to adhere against the internal surface of the crown structure.

The assembly of the carcass sleeve with the crown structure can be actuated on the same drum used for obtaining the carcass sleeve; in such case, this is termed "single-stage building process" or "unistage process". Also known are building processes of so-called "two-stage" type, in which a so-called "first-stage drum" is employed for obtaining the carcass sleeve, while the assembly between the carcass sleeve and the crown structure is actuated on a so-called "second-stage drum" or "shaping drum", on which the carcass sleeve drawn from the first-stage drum and subsequently the crown structure drawn from the auxiliary drum are transferred.

With the term "elastomeric material", it is intended to indicate a composition comprising at least one elastomeric polymer and at least one reinforcement filler. Preferably, such composition further comprises additives such as, for example, a cross-linking agent and/or a plasticiser. Due to the presence of the cross-linking agent, through heating such material can be cross-linked, so as to form the final manufactured product. By tyre for two-wheel vehicles, in particular motorcycles, it is intended a tyre whose curvature ratio is approximately comprised between about 0.15 and about 0.45.

By curvature ratio relative to a tyre (or to a portion thereof), it is intended the ratio between the distance of the radially external point of the tread band (or of the external surface) from the line passing through the laterally opposite ends of the tread itself (or of the external surface itself), measured on a radial plane of the tyre (or of said portion thereof), i.e. on a plane containing the rotation axis thereof, and the distance measured along the cord of the tyre (or of a portion thereof) between said ends.

By curvature ratio relative to a forming drum, it is intended the ratio between the distance of the radially external point of the external surface of the drum from the line passing through the laterally opposite ends of the drum itself, measured on a radial plane of the drum, i.e. on a plane containing the rotation axis thereof, and the distance measured along the cord of the drum between said ends.

In the document WO 2004/041520, on behalf of the same Applicant, the shaping drum can be carried by a robotic arm which interacts with a transfer member carrying the belt structure drawn from an auxiliary drum, in order to determine the coupling between the carcass structure and the belt structure. The robotic arm therefore carries the shaping drum in proximity to devices for applying the tread band and/or sidewalls comprising supply members arranged to deposit a continuous elongated element made of elastomeric material on the mutually coupled carcass structure and belt structure.

The document WO 2004/041522 illustrates a further example in which a shaping drum carried by a robotic arm is moved in order to interact with devices that complete the obtainment of the green tyre after having determined the application of a belt structure previously formed on an auxiliary drum.

US 2009/0020200 describes the obtainment of a tyre for two-wheel vehicles, in which a tread band is obtained by continuously winding a continuous elongated element made of elastomeric material in a spiral in the circumferential direction of the tyre being processed, supported by a rigid drum whose external surface profile copies the internal surface profile of the tyre being processed.

The Applicant has verified that in the execution of embodying methods of the type illustrated in WO 2004/041520 or WO 2004/041522, it may be difficult to ensure a correct mutual positioning between the crown structure comprising at least one belt layer and the carcass structure in the initial carcass sleeve form. The Applicant has perceived that this circumstance is particularly but not exclusively evident in the obtainment of tyres with a high curvature ratio, as can be typically found in the tyres for two-wheel vehicles.

The Applicant has also verified that the use of a substantially rigid toroidal forming drum, with fixed geometry of the type described in US 2009/0020200, tends to introduce process difficulties and criticalities, also involving significant logistics complications with regard to equipment and spaces required for the installation of the production plants.

The Applicant has thus realised that by obtaining the components of the crown structure directly on the shaped carcass sleeve according to the desired configuration thereof in the built green tyre, it is possible to ensure greater geometric and structural precision of the single components, and an optimal positioning of each of these with respect to other components of the tyre being processed.

The Applicant then verified that by forming the crown structure directly on the carcass sleeve, this eliminates the need to use and arrange layers made of elastomeric material or other auxiliary elements typically required for stabilizing the positioning of the components of the crown structure before its coupling with the carcass sleeve.

The Applicant has thus perceived that it is advantageous to arrange the shaped carcass sleeve on a substantially rigid toroidal forming drum with variable geometry (at least in radial direction) or expandable, shaped in part according to the internal geometric configuration of the built green tyre.

The Applicant has also realised that in order to prevent the carcass structure, initially formed as carcass sleeve according to a cylindrical shaping, from undergoing undesired structural distortions during shaping, it is opportune that the coupling of the forming drum be completed when the carcass sleeve is already shaped according to a toroidal configuration. The Applicant has therefore found that by coupling a substantially rigid and expandable toroidal forming drum to a substantially cylindrical carcass sleeve already formed, by means of shaping the carcass sleeve, expanding the toroidal forming drum and finally associating the latter with the shaped carcass sleeve, in order to subsequently execute the deposition of the crown structure, it is possible to obtain tyres whose structural elements, including the single components of the crown structure therein (at least one from among one or more belt layers, underlayer of the tread band, tread band, at least one sidewall portion), are in accordance with precise design specifications without involving significant processing waste. Such tyres can also be obtained in relatively simple, economical production plants that can be installed in limited spaces.

The presence of a forming drum with variable geometry by means of radial expansion then allows the same to be advantageously inserted contracted inside the carcass sleeve formed according to a cylindrical configuration, and to be radially expanded inside the carcass sleeve subsequently or at the same time as the toroidal shaping thereof, in order to determine the coupling thereof upon completed shaping. The structural rigidity of such forming drum finally ensures the carcass sleeve, shaped and coupled thereto, an excellent geometric and structural stability, which facilitates a precise positioning of the single elements that constitute the crown structure.

In accordance with a first aspect, the present invention relates to a method for building tyres.

Preferably provision is made for building a carcass sleeve and a crown structure of each tyre in sequence relative to each other.

Preferably said carcass sleeve is toroidally shaped and subsequently coupled to an expandable toroidal forming drum.

Preferably the crown structure is built on the radially external surface of said toroidally shaped carcass sleeve and associated with said expanded toroidal forming drum.

In accordance with a second aspect, the invention relates to a process for building tyres.

Preferably provision is made for arranging a carcass sleeve comprising at least one carcass ply and a pair of anchoring annular structures, Preferably provision is made for arranging a toroidal forming drum in a first radially contracted operative condition.

Preferably provision is made for positioning said carcass sleeve at a radially external position relative to said forming drum.

Preferably provision is made for toroidally shaping said carcass sleeve while said forming drum is positioned inside the carcass sleeve.

Preferably provision is made for expanding said forming drum up to a second radially expanded operative condition.

Preferably provision is made for coupling the carcass sleeve toroidally shaped to the forming drum in said second operative condition.

Preferably provision is made for arranging said forming drum, coupled to said carcass sleeve, in proximity to at least one device for building at least one belt layer at a radially external position relative to said carcass sleeve.

In accordance with a further aspect, the present invention relates to a plant for building tyres.

Preferably a shaping station is provided comprising devices for engaging a carcass sleeve.

Preferably shaping devices are provided, operating in the shaping station for shaping the carcass sleeve according to a toroidal configuration.

Preferably an expandable toroidal forming drum is provided, engageable in the shaping station in radially internal position with respect to the carcass sleeve.

Preferably actuator devices are provided, operating in the shaping station in order to radially expand the forming drum inside the carcass sleeve.

Preferably at least one belt structure application station is provided.

Preferably transfer devices are provided, configured for transferring the forming drum carrying said carcass sleeve toroidally shaped from the shaping station to said at least one belt structure application station.

The Applicant deems that the crown structure therefore can be obtained on the carcass structure shaped according to a precise predefined profile, set by the geometric configuration of the forming drum, advantageously selectable based on the design parameters of the tyre being processed. Thus, greater structural precision of the single components of the crown structure is attained, along with their positioning with respect to the other constituent elements of the tyre.

The Applicant finally deems that with the elimination of the need to couple, to the carcass sleeve, the belt structure and/or other components obtained apart from the crown structure, the problems related to process precision and repeatability are also overcome, which are typically correlated to the need to couple structural components obtained separately. A simplification of the production plants is also attained, since it is no longer necessary to execute additional operations, nor are relative machinery required for determining the transfer of the belt structure and/or other geometrically unstable components from the stations where they are constructed to the station where they must be coupled with the carcass structure itself.

Also eliminated is the execution of additional operations, and relative machinery and materials, required for the production and management of auxiliary components, such as sheets and the like, which can prove useful or necessary for temporarily stabilising the positioning of the different parts of the belt structure on a different auxiliary drum.

In at least one of the aforesaid aspects, the invention further comprises one or more of the following preferred characteristics that are described hereinbelow.

Preferably, the carcass sleeve is coupled in contact relation against an external surface of the forming drum.

Preferably, the carcass sleeve is obtained in at least one building station and subsequently transferred to a shaping station.

It is therefore possible to dedicate the shaping station to the execution of the shaping of the carcass sleeve in an accurate and precise manner, limiting the work cycle execution duration to the cycle-time required for obtaining the carcass sleeve on the building line.

Preferably, the carcass sleeve is fit coaxially around the forming drum arranged in the shaping station.

It is thus possible to engage the forming drum in the shaping station without having to wait until the loading of the carcass sleeve has completed.

The forming drum may be possibly subjected to additional processing in the shaping station, before the engagement of the carcass sleeve.

Preferably, the carcass sleeve is first moved with a radial translation movement relative to the forming drum until it is in a relation of substantial axial alignment therewith, and subsequently fit around the latter with an axial translation movement.

Preferably, the carcass sleeve is axially centred with respect to the forming drum before being shaped according to a toroidal shaping.

In this manner, it is ensured that an axial middle line plane of the forming drum substantially coincides with an axial middle line plane of the shaped carcass sleeve.

Preferably, the carcass sleeve is subjected to a radial expansion during shaping according to a toroidal configuration.

Preferably, at least one part of the expansion of the forming drum is actuated simultaneously with at least one part of the shaping of the carcass sleeve.

It is thus possible to reduce the cycle-time required in the shaping station, since the expansion of the forming drum can start without having to wait for the end of the shaping of the carcass sleeve.

Preferably, the external surface of the forming drum remains spaced from the carcass sleeve during an expansion of the forming drum, at least until the attainment of the second radially expanded operative condition.

The absence of contact between the carcass sleeve and the forming drum during shaping ensures a correct shaping of the carcass sleeve, not affected by hard to control mechanical interferences.

Preferably, at the end of the shaping, an internal surface of the carcass sleeve reaches a maximum diameter greater than the maximum diameter reached by the external surface of the forming drum in the second or expanded operative condition.

Preferably, the external surface of the forming drum is coupled against an internal surface of the carcass sleeve following a contraction of the shaped carcass sleeve.

Therefore, an optimal adhesion of the carcass sleeve on the forming drum can be verified, in a controlled and uniform manner.

Preferably, the contraction is obtained by means of evacuation of an operative inflation fluid from the shaped carcass sleeve.

Preferably, the shaping of the carcass sleeve occurs by means of introduction of an operative inflation fluid inside the carcass sleeve.

Preferably, at least one diameter size of the carcass sleeve is monitored during shaping.

Preferably, at least one diameter size of the forming drum is monitored during shaping.

Preferably, control actions are executed on the shaping of the carcass sleeve and/or on the radial expansion of the forming drum to prevent mutual contacts during shaping.

Preferably, the shaping of the carcass sleeve is interrupted upon reaching a predetermined maximum value of said diameter size of the carcass sleeve.

Preferably, a radial expansion of the forming drum up to the second operative condition is enabled upon reaching a predetermined value of said diameter size of the carcass sleeve.

In such a manner, it is ensured that there are no undesired premature contacts between the forming drum and the carcass sleeve, before the latter is correctly shaped.

Preferably, the built tyre is vulcanised after having been removed from the forming drum.

Preferably, said device for building at least one belt layer is installed in a belt structure application station that is remote relative to said shaping station.

Preferably, said at least one belt layer is obtained by winding at least one continuous elongated reinforcement element according to axially adjacent circumferential coils around a radially external surface of the carcass sleeve coupled to the forming drum.

Due to the high stickiness of the elastomeric material that constitutes the carcass ply/plies and/or the continuous elongated element, a stable and precise positioning of the single coils is thus ensured, even when the shaped carcass has a profile with accentuated curvature.

Preferably, a tread band is formed at a radially external position around said at least one belt layer made on the carcass sleeve.

The tread band can thus be obtained directly according to the final geometric shape that it must have in the built green tyre. Thus, there is no longer the need for subsequent handling in order to adapt the shaping of the tread band to that of the underlying carcass sleeve, and hence no consequent undesired material upsettings and/or other uncontrolled deformations.

Preferably, the tread band is obtained by means of winding at least one continuous elongated element made of elastomeric material according to consecutively adjacent circumferential coils around a radially external surface of said at least one belt layer.

It is thus possible to increase the operative flexibility of the process and machinery, suitably modulating the number and position of the coils as a function of the geometric and size characteristics that one wishes to confer to the tread band.

Preferably, the carcass sleeve coupled to said at least one belt layer has a curvature ratio comprised between about 0.15 and about 0.45.

In such a manner, optimal conditions are attained for building tyres adapted for two-wheel vehicles.

Preferably, the following are provided: a carcass building line and carcass loading devices configured for transferring the carcass sleeve from the carcass building line to the shaping station.

Preferably, said carcass loading devices comprise a handling device operating on a radially external surface of the carcass sleeve, Preferably, the forming drum in a first radially contracted operative condition has a maximum external diameter smaller than a minimum internal diameter of the carcass sleeve.

Preferably, the forming drum comprises a central shaft and a plurality of sectors circumferentially distributed around the central shaft and movable from a first operative condition, in which said sectors are close to the central shaft, to a second operative condition in which said sectors are moved away from the central shaft.

Preferably, each sector has an external surface shaped according to an internal surface configuration to be given to the shaped carcass sleeve.

Preferably, the sectors are carried by respective telescopically extendable guide members, radially extending from the central shaft.

Preferably, the forming drum comprises transmission mechanisms operatively engageable by said actuator devices and configured for simultaneously translating the sectors from the first operative condition to the second operative condition.

Preferably, said transmission mechanisms comprise control levers each hinged to one of said sectors and to at least one control collar slidably fit along the central shaft.

Preferably, the control collar is operatively connected to a threaded bar rotatably engaged in the central shaft.

Preferably, the actuator devices comprise a rotary driving device operatively engageable with the threaded bar to a first end of the central shaft.

Preferably, said engagement devices comprise a pair of flange elements coaxially facing each other and operatively engageable with respective anchoring annular structures carried by respective axially opposite ends of the carcass sleeve.

Preferably, said engagement devices comprise members for axially moving the flange elements.

Preferably, said axial movement members comprise at least one carriage carrying one of said flange elements and movable towards the other flange element in order to switch the shaping station between a loading/unloading condition, in which the flange elements are mutually spaced according to a measure greater than an axial size of the non-shaped carcass sleeve, coming from the carcass building line, and a work condition, in which the flange elements are mutually spaced according to a measure substantially corresponding to the axial size of the carcass sleeve.

Preferably, in the loading/unloading condition, the flange elements are mutually spaced according to a measure at least double the axial size of the non-shaped carcass sleeve.

Preferably, each of said flange elements comprises at least one circumferential sealing ring configured for operating against one of said anchoring annular structures.

Preferably, said flange elements further comprise expansion members configured for determining a radial expansion of the respective circumferential seal rings.

Preferably, the actuator devices are housed inside at least one of said flange elements.

Preferably, said shaping devices comprise a fluid-dynamic circuit for introducing an operative inflation fluid inside the carcass sleeve.

Preferably, said shaping devices comprise axial movement devices, operating on at least one of the flange elements in order to move them axially towards each other starting from the aforesaid work condition.

Preferably, devices are provided for monitoring the radial sizes respectively assumed by the carcass sleeve and by the forming drum in order to prevent mutual contacts thereof during shaping.

Preferably, said monitoring devices are configured for enabling control actions on the actuator devices and/or on the shaping devices when the difference between the external diameter of the carcass sleeve and the external diameter of the forming drum falls below a pre-established threshold value.

Preferably, said belt structure application station is integrated in a green tyre completion line.

Preferably, the belt structure application station comprises devices for building at least one belt layer configured for winding at least one continuous elongated reinforcement element according to axially adjacent circumferential coils around a radially external surface of the carcass sleeve coupled to the forming drum.

Preferably, said green tyre completion line comprises devices for obtaining tread bands.

Preferably, the tread band obtainment devices comprise at least one twisting unit configured for winding at least one continuous elongated elastomeric element according to circumferential coils, axially adjacent in mutual contact, around said belt structure.

Preferably the forming drum has, in the second operative condition, a curvature ratio comprised between about 0.15 and about 0.45.

Further characteristics and advantages will be clearer from the detailed description of a preferred but not exclusive embodiment of a method, a process and a plant for obtaining tyres, in accordance with the present invention.

Figure 2:
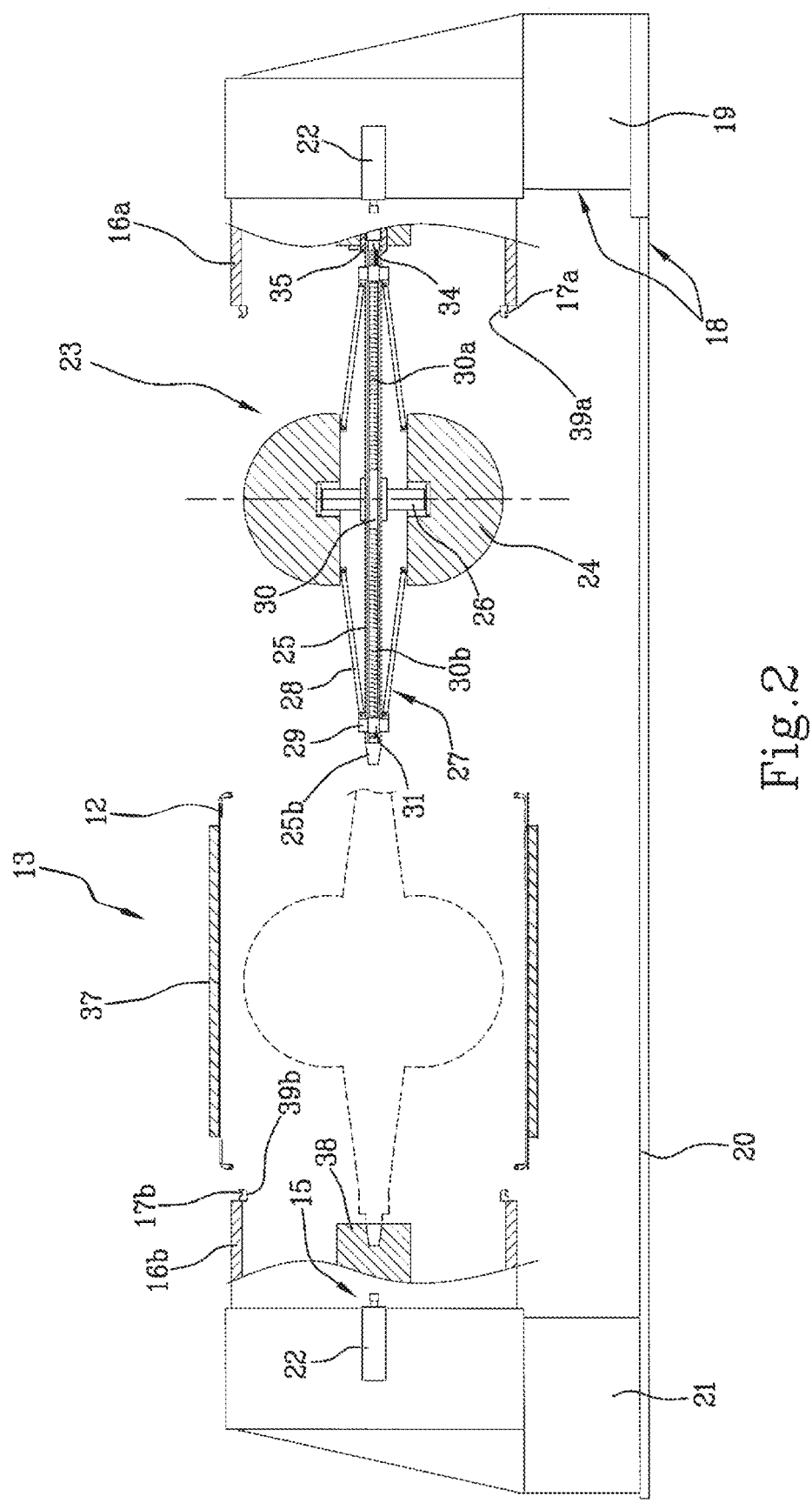
Figure 3:
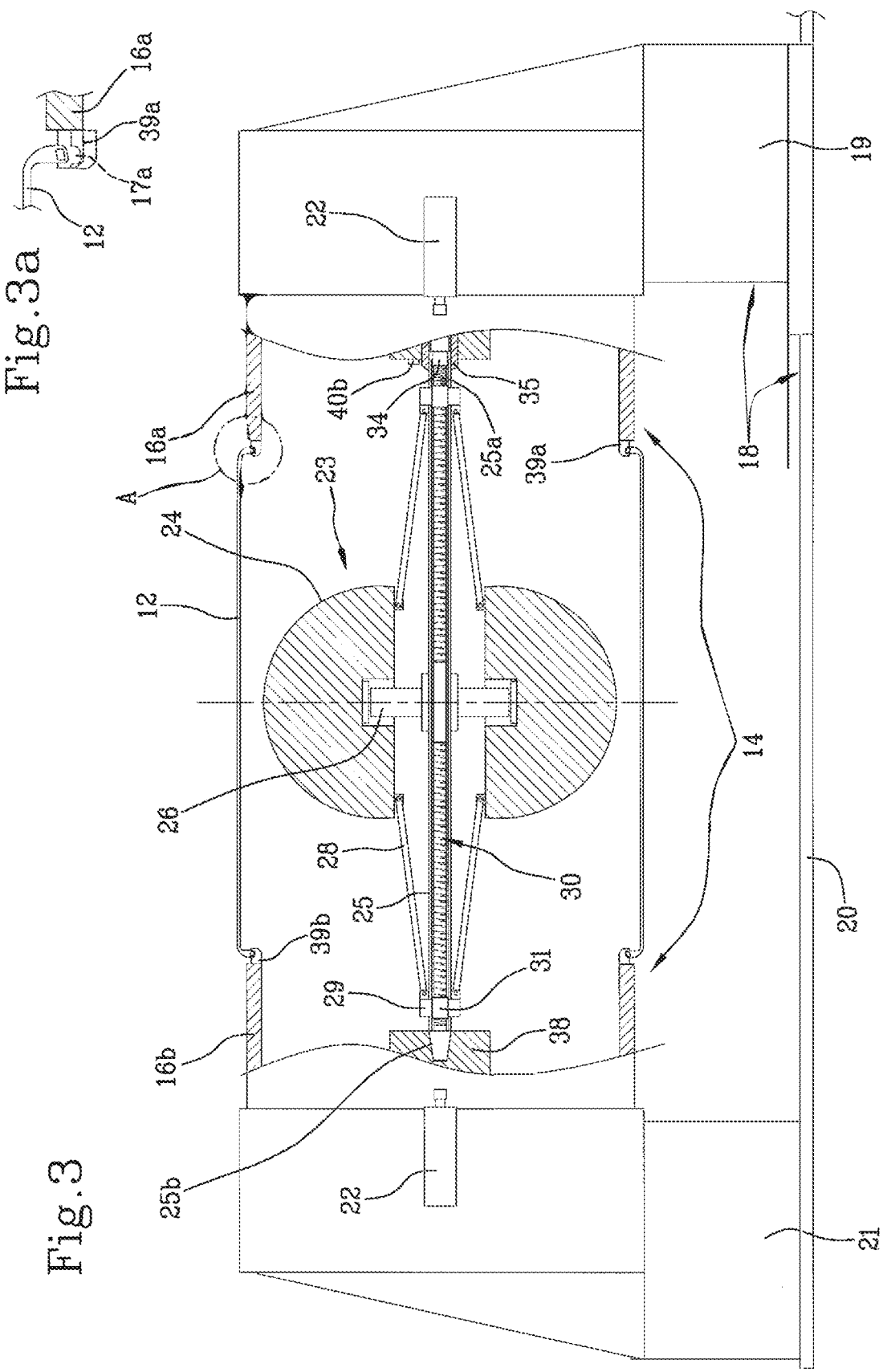
Figure 4:
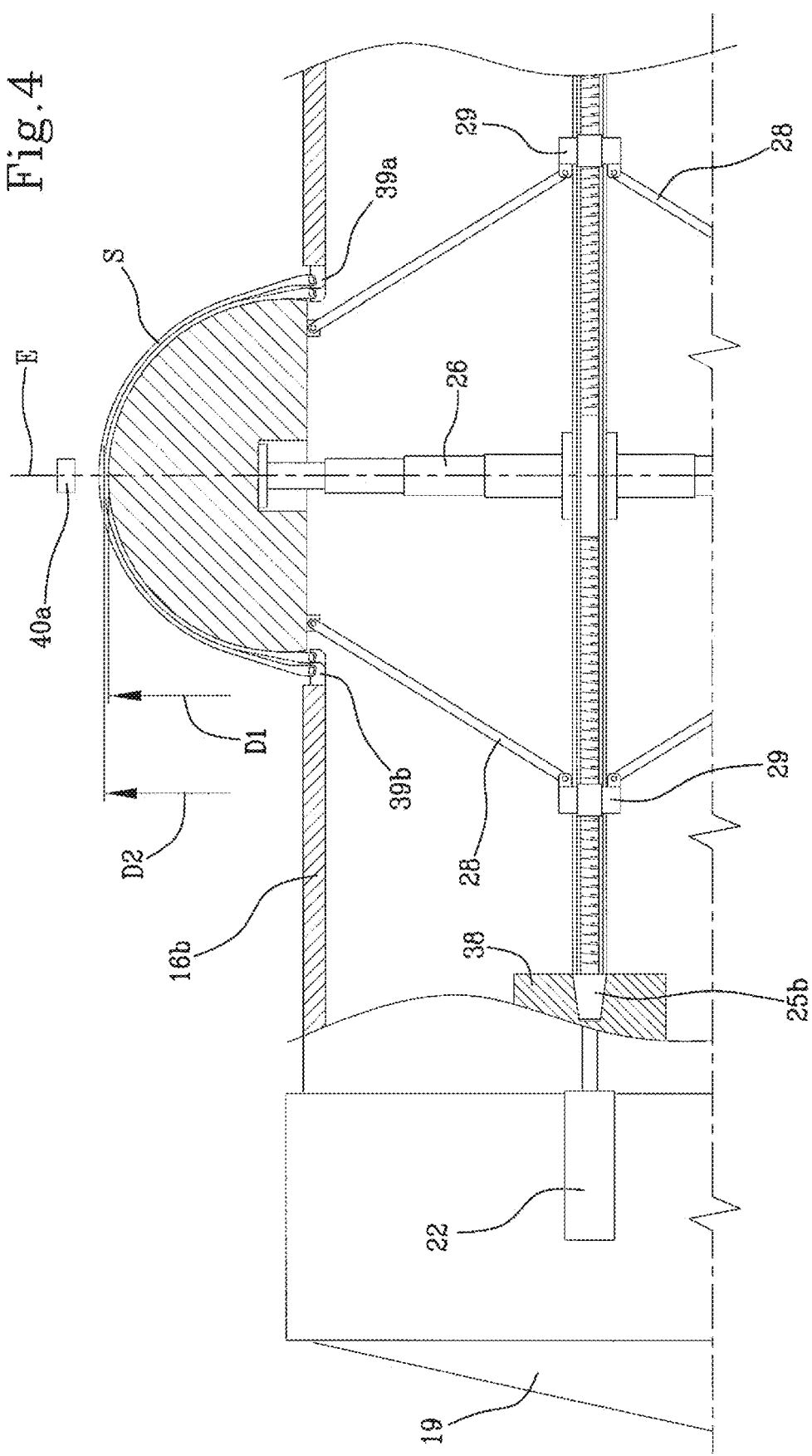
Figure 5:
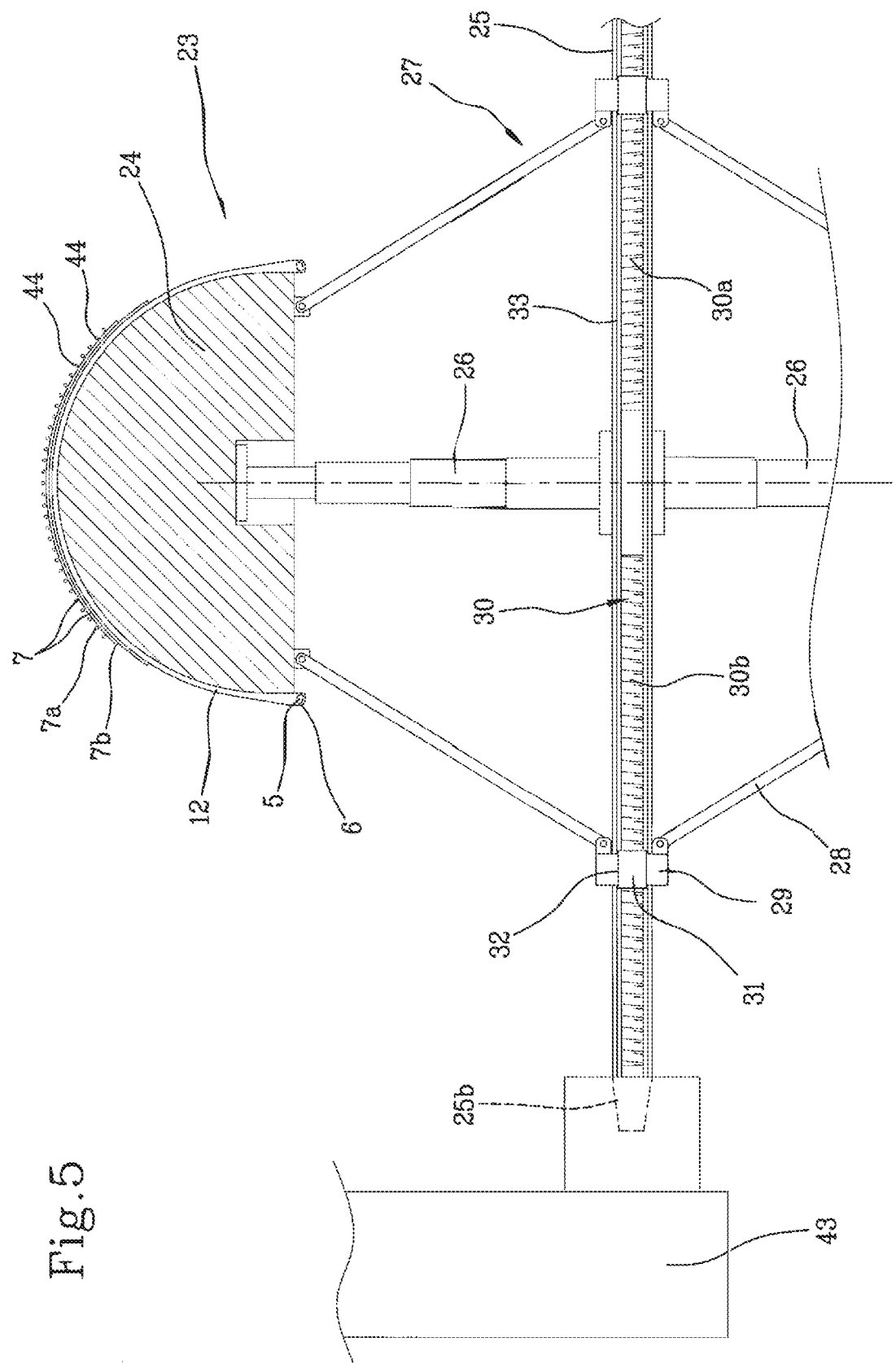
Figure 6:
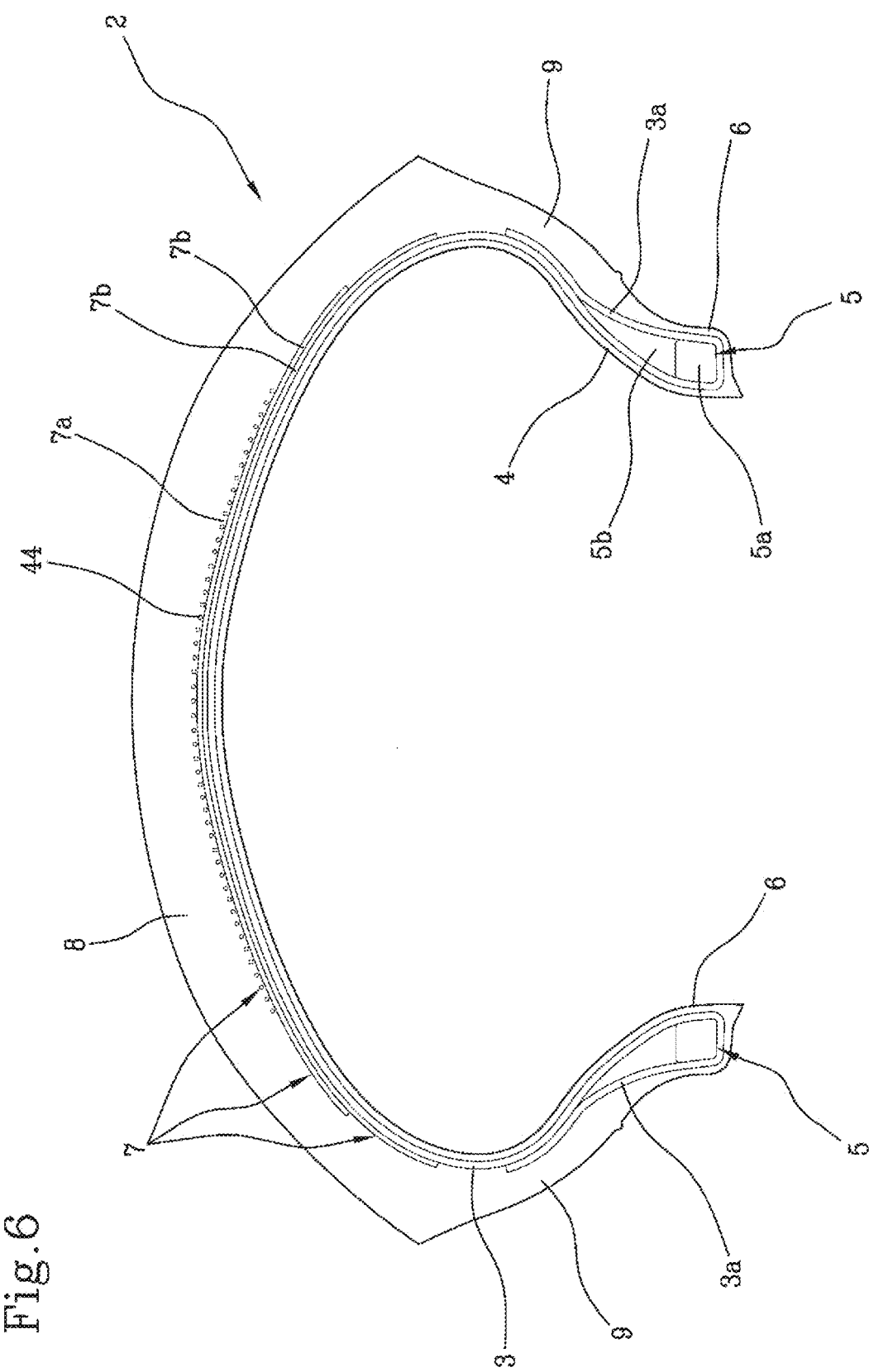

Such description will be set forth hereinbelow with reference to the enclosed drawings, provided only as a non-limiting example, in which:

FIG. 1 schematically shows a top view of a plant for building tyres in accordance with the present invention;

FIG. 2 schematically shows, in side view and in partial section, the loading of a carcass sleeve on a shaping station;

FIG. 3 schematically shows, in side view and in partial section, the engagement of the carcass sleeve with shaping devices arranged in the shaping station;

FIG. 3a shows an enlargement of the detail indicated with "A" in FIG. 3;

FIG. 4 schematically shows, in side view and in partial section, the execution of the shaping of the carcass sleeve;

FIG. 5 shows the application of a belt layer on the shaped carcass sleeve coupled to a forming drum;

FIG. 6 schematically shows, in radial half-section, a tyre obtainable in accordance with the present invention.

With reference to the abovementioned figures, reference number 1 indicates overall a plant for building tyres for vehicle wheels, arranged to actuate a process according to the present invention.

The plant 1 is set to obtain tyres 2 (FIG. 6) essentially comprising at least one carcass ply 3 preferably internally covered by an impermeable elastomeric material layer or so-called liner 4. Two anchoring annular structures 5, each comprising a so-called bead core 5a carrying preferably an elastomeric filler 5b in radially external position, are engaged with respective terminal flaps 3a of the carcass ply/plies 3. The anchoring annular structures 5 are integrated in proximity to zones normally identified with the name of "beads" 6, at which the engagement between the tyre 2 and a respective mounting rim (not depicted) normally occurs.

A belt structure 7 is circumferentially applied around the carcass ply/plies 3, and a tread band 8 is circumferentially superimposed on the belt structure 7. Two sidewalls 9, each extended from the corresponding bead 6 to a corresponding lateral edge of the tread band 8, are applied at laterally opposite positions on the carcass ply/plies 3.

The plant 1 comprises a carcass building line 10 having one or more building stations 11 where the obtainment of a carcass sleeve 12 having substantially cylindrical shape is executed, for example according to known modes. The carcass sleeve 12 comprises said at least one carcass ply 3, preferably internally covered by the liner 4, and having the respective end flaps 3a engaged, e.g. by turning up, with the respective anchoring annular structures 5. If necessary, the carcass sleeve 12 can also comprise the sidewalls 9 or first portions thereof, each extended starting from a respective bead 6.

The carcass budding line 10 belongs to a shaping station 13 comprising devices 14 for engaging the carcass sleeve 12 and shaping devices 15, upon whose action the carcass sleeve 12 is shaped according to a toroidal configuration.

The engagement devices 14 for example comprise a first flange element 16a and a second flange element 16b, coaxially facing each other and having respective circumferential engagement seats 17a, 17b, by means of which they are each operatively engageable at one of the anchoring annular structures 5 respectively carried by the axially opposite ends of the carcass sleeve 12.

The engagement devices 14 can also comprise axial movement members 18 for the flange elements 16a, 16b. More in detail, it can be provided that at least one of the flange elements 16a, 16b, e.g. the first flange element 16a, is carried by a carriage 19 movable along one or more linear guides 20, parallel to a geometric axis X-X of mutual alignment between the flange elements 16a, 16b and preferably integral with respect to a fixed base 21, carrying the second flange element 16b. The movement of the carriage 19 along the linear guides 20 determines the switching of the shaping station 13 between a loading/unloading condition and a work condition. In the loading/unloading condition (FIG. 2), the first flange element 16a is spaced from the second flange element 16b according to a greater measure, approximately at least double, with respect to an axial size of the non-shaped carcass sleeve 12, coming from the carcass building line 10. In the work condition, the flange elements 16a, 16b, and more precisely the respective circumferential engagement seats 17a, 17b thereof, are mutually spaced according to a measure substantially corresponding to the axial size of the carcass sleeve 12.

The shaping devices 15 can for example comprise a fluid-dynamic circuit (not shown) for introducing pressurised air or another operative inflation fluid between the flange elements 16a, 16b, inside the carcass sleeve 12.

The shaping devices 15 can also comprise one or more linear actuators or other axial movement devices 22, operating on one or preferably both the flange elements 16a, 16b in order to move them axial towards each other starting from the aforesaid work condition. The mutual approaching of the flange elements 16a, 16b causes a mutual approaching of the anchoring annular structures 5 so as to allow the shaping of the carcass sleeve 12 according to a toroidal configuration, assisted by the simultaneous introduction of the pressurised operative fluid into the carcass sleeve 12.

In the shaping station 13, the shaped carcass sleeve 12 is coupled to a toroidal forming drum 23, rigid and expandable, arranged inside the carcass sleeve itself.

The forming drum 23 is expandable between a first operative condition, radially contracted (FIGS. 2 and 3), and a second radially expanded operative condition (FIGS. 4 and 5). For such purpose, it can for example be provided that the forming drum 23 comprise a plurality of sectors 24 circumferentially distributed around a central shaft 25. The sectors 24 are movable, preferably simultaneously with each other, from the aforesaid first operative condition in which they are close to the central shaft 25, to the second operative condition in which said sectors 24 are moved away from the central shaft 25. For such purpose, it can be provided that the sectors 24 are carried by respective telescopically extendable guide members 26, radially extending from the central shaft 25.

The movement of the sectors 24 can be attained by means of transmission mechanisms 27 comprising for example control levers 28 that are hinged, each at the respectively opposite ends thereof, to one of said sectors 24 and to at least one control collar 29 slidably fit along the central shaft 25. More particularly, a pair of control collars 29 are preferably provided, situated along the central shaft 25 in axially opposite positions with respect to the sectors 24, each engaging the respective control levers 28.

Each control collar 29 is operatively connected to a threaded bar 30, rotatably engaged coaxially inside the central shaft 25. The threaded bar 30 is extended along the central shaft 25, nearly for the entire length thereof or beyond, and carries two axially opposite threads 30a, 30b, respectively clockwise and anticlockwise. Operatively engaged on the threads 30a, 30b are respective nut screws 31, axially movable inside the central shaft 25 and each connected to one of the control collars 29, e.g. by means of at least one block 32 radially traversing the central shaft 25 at a longitudinal slit 33.

The rotation of the threaded bar 30 in the central shaft 25, actuatable by means of a rotary driving device 34 or actuator devices of another type operating in the shaping station 13, causes an axial movement of the nut screws 31 and the control collars 29, to which a radial movement of the sectors 24 corresponds, towards the first or the second operative condition in accordance with the rotation sense of the threaded bar 30.

In the second operative condition, the set of sectors 24 of the forming drum 23 defines, along the circumferential extension thereof, a radially external toroidal surface "S", not necessarily continuous, shaped according to the internal configuration that a part of the carcass sleeve 12 must assume upon completed shaping. More in detail, it can advantageously be provided that the forming drum 23 in the second operative condition has a curvature ratio comprised between about 0.15 and about 0.45, typically adapted for obtaining tyres for motorcycles or other two-wheel vehicles. If necessary, however, curvature ratios can be employed of values lower than those indicated above, for example adapted for producing tyres for cars or trucks.

Preferably, the forming drum 23 is positioned in the shaping station 13 before the respective carcass sleeve 12, for example still being processed along the carcass building line 10, reaches the shaping station 13 itself.

More particularly, it is preferably provided that the forming drum 23 is projectingly supported in the shaping station 13. For example, a first end 25*a* of the central shaft 25 of the forming drum 23 can for such purpose be retained by a mandrel 35 coaxially housed in the first flange element 10*a* and provided with a rotary driving device 34 couplable with the threaded bar 30 in order to drive it in rotation.

The forming drum 23 can therefore be arranged in the first operative condition by means of said rotary driving device 34, if it is not already in such condition upon reaching the shaping station 13.

By means of carcass loading devices 36, the carcass sleeve 12 coming from the carcass building line 10 is then transferred into the shaping station 13 in order to be coaxially arranged at a radially external position around the forming drum 23 arranged in the first radially contracted operative condition.

The carcass loading devices 36 can for example comprise a carcass handling device 37 preferably operating on an external surface of the carcass sleeve 12, With a radial translation movement (with respect to the forming drum 23), the carcass sleeve 12 is first inserted, in axial alignment relation with the forming drum 23, between the flange elements 16*a*, 16*b* arranged in the loading/unloading condition (FIG. 2). The carcass sleeve 12 is subsequently arranged around the forming drum 23, preferably following an axial translation movement of the forming drum itself, More particularly, with a movement of the carriage 19 along the linear guides 20, the forming drum 23 is coaxially inserted in the carcass sleeve 12.

Preferably, the translation of the carriage 19 and the forming drum 23 terminates with the engagement of a second end 25*b* of the central shaft 25 with a tailstock 38, situated inside the second flange element 16*b* (dashed line in FIG. 2).

For the axial movement of the forming drum 23 with respect to the carcass sleeve 12 to occur without mutual mechanical interferences, it is preferably provided that in the first operative condition, the forming drum 23 has a maximum external diameter smaller than a minimum internal diameter of the carcass sleeve 12, typically detectable at the beads 6.

At the end of the axial movement, each of the anchoring annular structures 5 integrated in the beads 6 is situated in axially internal position with respect to the circumferential engagement seat 17*a*, 17*b* of the respective first and second flange element 16*a*, 16*b*.

Upon action of the axial movement devices 22, the flange elements 16*a*, 16*b* then carry the respective engagement seats 17*a*, 17*b* substantially in radial alignment relation inside the anchoring annular structures 5.

Each of said flange elements 16*a*, 16*b* comprises expansion members (not depicted) configured for determining a radial expansion of respective circumferential seal rings 39*a*, 39*b* integrating the circumferential engagement seats 17*a*, 17*b*. Following such radial expansion, each of the circumferential seal rings 39*a*, 39*b* is brought to act in thrust relation against one of the anchoring annular structures 5. The carcass sleeve 12 is thus stably constrained to the flange elements 16*a*, 16*b*. Upon completed engagement, the carcass handling device 37 can disengage the carcass sleeve 12 and be removed from the shaping station 13.

During shaping, when the carcass sleeve 12 starts to radially expand, the radial expansion of the shaping drum can be controlled by means of rotation of the threaded bar 30 upon action of the rotary driving device 34.

The shaping of the carcass sleeve 12 is executed without contact between the latter and the forming drum 23, at least until the forming drum 23 itself has reached the maximum radial expansion, upon attaining its second operative condition.

For such purpose, it can be provided to use monitoring devices 40*a*, 40*b* that cyclically or continuously verify the diameter size respectively assumed by the carcass sleeve 12 and by the forming drum 23, to prevent mutual contacts thereof during the shaping step. In response to such monitoring actions, when the difference between the external diameter of the carcass sleeve 12 and the external diameter of the forming drum 23, for example at an axial middle line plane "E" perpendicular to the geometric axis X-X and equidistant from the flange elements 16*a*, 16*b* and/or from the anchoring annular structures 5, falls below a pre-established threshold value, the monitoring devices 40*a*, 40*b* enable control actions on the rotary driving device 34 and/or on the shaping devices 15, such that the external surface of the toroidal forming drum 23 remains spaced from the carcass sleeve 12 during the expansion of the forming drum 23, at least until the second radially expanded operative condition of the forming drum 23 has been reached.

By way of example, the monitoring devices 40*a*, 40*b* can comprise at least one first optical sensor 40*a* positioned outside the carcass sleeve 12 in order to detect the external diameter thereof in proximity to the axial middle line plane "E", and at least one transducer 40*b* positioned inside one of the flange elements 16*a*, 16*b* and/or coupled to the rotary driving device 34 in order to detect the axial position assumed by at least one of the control collars 29 and/or the extent of the angular rotation completed by the threaded bar 30, so as to allow an electronic processing unit to calculate the value of the external diameter assumed by the forming drum 23.

Upon reaching a predetermined maximum value of the diameter size of the carcass sleeve 12, the action of the shaping devices is interrupted and the completion of the radial expansion of the forming drum 23 is enabled, bringing it to reach the second operative condition.

Then, the coupling is enabled between the carcass sleeve 12 and forming drum 23. Such coupling is verified by carrying an internal surface of the carcass sleeve 12 in contact relation against the radially external toroidal surface "S" of the forming drum 23.

It is preferably provided that at the end of the shaping, the internal surface of the carcass sleeve 12 reaches a maximum diameter "D2" greater than the maximum diameter "D1" reached by the external surface of the forming drum 23 in the second operative condition. The coupling can therefore be actuated following a slight radial contraction of the carcass sleeve 12, for example obtained due to an elastic contraction of the same following the evacuation of the operative fluid previously introduced during shaping.

In order to facilitate an expansion of the carcass sleeve 12 beyond the maximum diameter reached by the forming drum 23 in the second operative condition, it can be provided that in the final steps of approaching the maximum radial expansion condition of the carcass sleeve 12, the flange elements 16*a*, 16*b* are axially inserted in radially internal position with respect to the sectors 24 of the forming drum 23, which is about to reach the second operative condition.

The attainment of a coupling by means of radial contraction of the carcass sleeve 12 facilitates a uniform contact and in the absence of friction between the internal surface of the carcass sleeve 12 and the forming drum 23, preserving the structural integrity of the carcass sleeve 12 without inducing density variations in the distribution of the cords that constitute the carcass ply or plies, and/or other structural distortions.

Upon completed coupling, the flange elements 16a, 16b disengage the carcass sleeve 12, leaving it on the forming drum 23.

Carcass sleeve 12 and forming drum 23 in mutual coupling relation are adapted to be subjected to the action of at least one device 41 for building at least one belt layer at a radially external position relative to the shaped carcass sleeve 12. Such device 41 is preferably installed in a belt structure application station 42 that is remote relative to said shaping station 13.

In order to allow the transfer of the forming drum 23 to the belt structure application station 42, it is provided that the forming drum 23 carrying the carcass sleeve 12 be supported by the mandrel 35 operating at the first end 25a of the central shaft 25, while the tailstock 38 disengages from the second end 25b of the central shaft 25 itself, With a retreating of the first flange element 16a, the shaping station 13 is brought back into the loading/unloading condition, freeing the access to a first anthropomorphic robotic arm 43 or other suitable transfer devices, which in turn engages the forming drum 23 at the second end 25b of the central shaft 25.

The first robotic arm 43 transfers the forming drum 23 from the shaping station 13 to the belt structure application station 42. The first robotic arm 43 also suitably moves the forming drum 23 in front of the device 41 for building the belt layer, which can for example comprise a dispenser that feeds at least one rubber-covered cord or other continuous elongated reinforcement element made of textile or metallic material. A belt layer 7a is therefore obtained by winding said continuous elongated reinforcement element according to axially adjacent circumferential coils 44 around the radially external surface of the carcass sleeve 12 coupled to the expanded toroidal forming drum 23, while the latter is driven in rotation and suitably moved by the first robotic arm 43.

The rigidity of the forming drum 23 ensures a stable positioning of the single circumferential coils 44 formed directly on the external surface of the shaped carcass sleeve 12, without undesired deformations of the carcass sleeve 12 occurring due to the stresses transmitted on its external surface during application. The stickiness of the green elastomeric material that constitutes the carcass ply or plies 3 prevents undesired spontaneous and/or non-controlled movements of the single circumferential coils 44, without having to arrange for this purpose additional intermediate layers between the belt layer 7a in manufacturing step and the underlying application surface. In other words, a precise positioning is facilitated of the single circumferential coils 44 of the belt layer 7a, directly formed according to the desired final profile of the carcass sleeve 12 upon completed shaping, even when such profile has an accentuated transverse curvature as is for example found in tyres intended for motorcycles or two-wheel vehicles.

The belt structure application station 42 can if necessary comprise building devices 45 of one or more auxiliary layers 7b, to be applied on the shaped carcass sleeve 12 before or after the application of said at least one belt layer 7a. In particular, such auxiliary layers 7b can comprise textile or metallic parallel cords, arranged according to an orientation that is tilted with respect to the circumferential extension direction of the carcass sleeve 12, respectively crossed between auxiliary layers 7b adjacent to each other.

The transfer of the forming drum 23 between the auxiliary layer building devices 45 and the belt layer building device 41 can be assigned to the same first robotic arm 43, or to a second anthropomorphic robotic arm or handling device of another type.

The forming drum 23 is then transferred from the belt structure application station 42 to devices for obtaining tread bands 47, preferably constituting part of a green tyre completion line integrating the belt structure application station 42.

The tread band obtainment devices 47 can for example comprise at least one twisting unit configured for winding at least one continuous elongated elastomeric element according to circumferential coils, axially adjacent in mutual contact, at a radially external position around the belt structure 7, while the forming drum 23 is driven in rotation and suitably moved for distributing the circumferential coils according to a predefined scheme.

The plant 1 can finally comprise sidewall obtainment devices (not shown) against axially opposite lateral portions of the carcass sleeve 12.

The built green tyre 2 is adapted to be removed from the forming drum 23 in order to be vulcanised in a vulcanisation unit 52.

The invention claimed is:

1. A plant for building tyres, comprising:
   a shaping station comprising devices for engaging a carcass sleeve;
   shaping devices operating in the shaping station for shaping the carcass sleeve according to a toroidal configuration;
   an expandable toroidal forming drum engageable in the shaping station at a radially internal position relative to the carcass sleeve while the forming drum is at a radially contracted first operative condition and spaced from the carcass sleeve;
   actuator devices operating in the shaping station for radially expanding the forming drum inside the carcass sleeve up to a radially expanded second operative condition while spaced from the carcass sleeve being shaped according to the toroidal configuration, an external surface of the forming drum remaining spaced from the carcass sleeve at least until the second radially expanded operative condition is reached;
   at least one belt structure application station; and
   transfer devices configured for transferring the forming drum, while expanded in said second operative condition and carrying said toroidally shaped carcass sleeve, from the shaping station to said at least one belt structure application station.

2. The plant as claimed in claim 1, further comprising:
   a carcass building line; and
   carcass loading devices configured for transferring the carcass sleeve from the carcass building line to the shaping station.

3. The plant as claimed in claim 2, wherein said carcass loading devices comprise a carcass handling device operating on a radially external surface of the carcass sleeve.

4. The plant as claimed in claim 1, wherein the forming drum in the first radially contracted operative condition has a maximum external diameter smaller than a minimum internal diameter of the carcass sleeve.

5. The plant as claimed in claim 1, wherein the forming drum comprises a central shaft and a plurality of sectors circumferentially distributed around the central shaft and movable from the first operative condition, wherein said sectors are close to the central shaft, to the second operative condition, wherein said sectors are moved away from the central shaft.

6. The plant as claimed in claim 5, wherein each sector has an external surface shaped according to an internal surface configuration to be given to the shaped carcass sleeve.

7. The plant as claimed in claim 5, wherein the sectors are carried by respective telescopically extendable guide members, radially extending from the central shaft.

8. The plant as claimed in claim 5, wherein the forming drum comprises transmission mechanisms operatively engageable by said actuator devices and configured for simultaneously translating the sectors from the first operative condition to the second operative condition.

9. The plant as claimed in claim 8, wherein said transmission mechanisms comprise control levers, each hinged to one of said sectors and to at least one control collar slidably fitted along the central shaft.

10. The plant as claimed in claim 9, wherein the control collar is operatively connected to a threaded bar rotatably engaged in the central shaft.

11. The plant as claimed in claim 10, wherein the actuator devices comprise a rotary driving device operatively engageable with the threaded bar at a first end of the central shaft.

12. The plant as claimed in claim 1, wherein said engagement devices comprise a pair of flange elements coaxially facing each other and operatively engageable with respective anchoring annular structures carried by respective axially opposite ends of the carcass sleeve.

13. The plant as claimed in claim 12, wherein said engagement devices comprise axial movement members for the flange elements.

14. The plant as claimed in claim 13, wherein said axial movement members comprise at least one carriage carrying one of said flange elements and movable towards the other flange element in order to switch the shaping station between a loading or unloading condition, in which the flange elements are mutually spaced according to a measure greater than an axial size of the non-shaped carcass sleeve, coming from the carcass building line, and a work condition, in which the flange elements are mutually spaced according to a measure substantially corresponding to the axial size of the carcass sleeve.

15. The plant as claimed in claim 14, wherein in the loading or unloading condition, the flange elements are mutually spaced according to a measure at least double the axial size of the non-shaped carcass sleeve.

16. The plant as claimed in claim 12, wherein each of said flange elements comprises at least one circumferential sealing ring configured for operating against one of said anchoring annular structures.

17. The plant as claimed in claim 16, wherein said flange elements further comprise expansion members configured for determining a radial expansion of the respective circumferential sealing rings.

18. The plant as claimed in claim 12, wherein the actuator devices are housed inside at least one of said flange elements.

19. The plant as claimed in claim 1, further comprising devices for monitoring the radial sizes respectively assumed by the carcass sleeve and by the forming drum, to prevent mutual contacts thereof during shaping of the carcass sleeve.

20. The plant as claimed in claim 19, wherein said monitoring devices are configured for enabling control actions on the actuator devices and/or on the shaping devices when the difference between the external diameter of the carcass sleeve and the external diameter of the forming drum falls below a pre-established threshold value.

21. The plant as claimed in claim 5, wherein the forming drum has, in the second operative condition, a curvature ratio comprised between about 0.15 and about 0.45.

* * * * *